US012132735B1

(12) United States Patent
Razavi et al.

(10) Patent No.: US 12,132,735 B1
(45) Date of Patent: Oct. 29, 2024

(54) SPECIFICATION LANGUAGE FOR GENERATING GRAPH REACHABILITY-BASED ANALYSES FOR CLOUD-BASED SYSTEM RESOURCES

(71) Applicant: Amazon Technologies, Inc., Seattle, WA (US)

(72) Inventors: Niloofar Razavi, San Jose, CA (US); Oksana Tkachuk, Palo Alto, CA (US); Zhixing Xu, Sunnyvale, CA (US); Saeed Nejati, Seattle, WA (US); Meng Li, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 210 days.

(21) Appl. No.: 17/855,302

(22) Filed: Jun. 30, 2022

(51) Int. Cl.
*H04L 29/06* (2006.01)
*G06F 16/33* (2019.01)
*G06F 16/36* (2019.01)
*H04L 9/40* (2022.01)

(52) U.S. Cl.
CPC ............ *H04L 63/10* (2013.01); *G06F 16/334* (2019.01); *G06F 16/367* (2019.01); *H04L 63/1433* (2013.01); *H04L 63/20* (2013.01)

(58) Field of Classification Search
CPC ..... H04L 63/10; H04L 63/1433; H04L 63/20; G06F 16/334; G06F 16/367
See application file for complete search history.

(56) References Cited

U.S. PATENT DOCUMENTS 11,048,766 B1 * 6/2021 Chen ................... G06F 16/9014
11,106,706 B1 * 8/2021 Bates ................... G06F 3/04842

* cited by examiner

*Primary Examiner* — Tri M Tran
(74) *Attorney, Agent, or Firm* — Nicholson DeVos Webster & Elliott LLP

(57) ABSTRACT

Techniques are described for a domain-specific language and associated framework for implementing analyses of security, operational, or functional properties involving computing resources. The specification language enables users to readily define the semantics of a set of cross-resource relations of interest using a human-readable language. For example, the language enables users to express properties over computing resources based on a user-defined set of cross-resource relations. The specification language is human-readable, allowing users to easily add new cross-resource relations or to modify existing relations and properties, thereby enabling users to readily modify existing analyses or to create new ones entirely. The specification language is also machine-readable such that a compiler and other tools can automatically generate an ontology model based on local resource configurations, augment the graph with the cross-resource relations defined in the specifications, and perform graph reachability analyses based on defined properties of interest.

20 Claims, 9 Drawing Sheets

SPECIFICATION LANGUAGE FOR GENERATING GRAPH REACHABILITY-BASED ANALYSES FOR CLOUD-BASED SYSTEM RESOURCES

BACKGROUND

Cloud provider networks enable users to use a variety of computing-related resources such as compute resources, storage resources, networking resources, and the like. When a user or application interacts with a cloud provider network (e.g., using an application programming interface (API), command line interface (CLI), or web-based console provided by the cloud provider network), the user or application typically is required to provide security credentials used by the cloud provider to authenticate the user or application and to determine whether the user or application has permission to access the requested resources or actions. The security credentials can include, for example, usernames and passwords, access keys, and the like.

BRIEF DESCRIPTION OF DRAWINGS

Various embodiments in accordance with the present disclosure will be described with reference to the drawings, in which.

DETAILED DESCRIPTION

Figure 1:
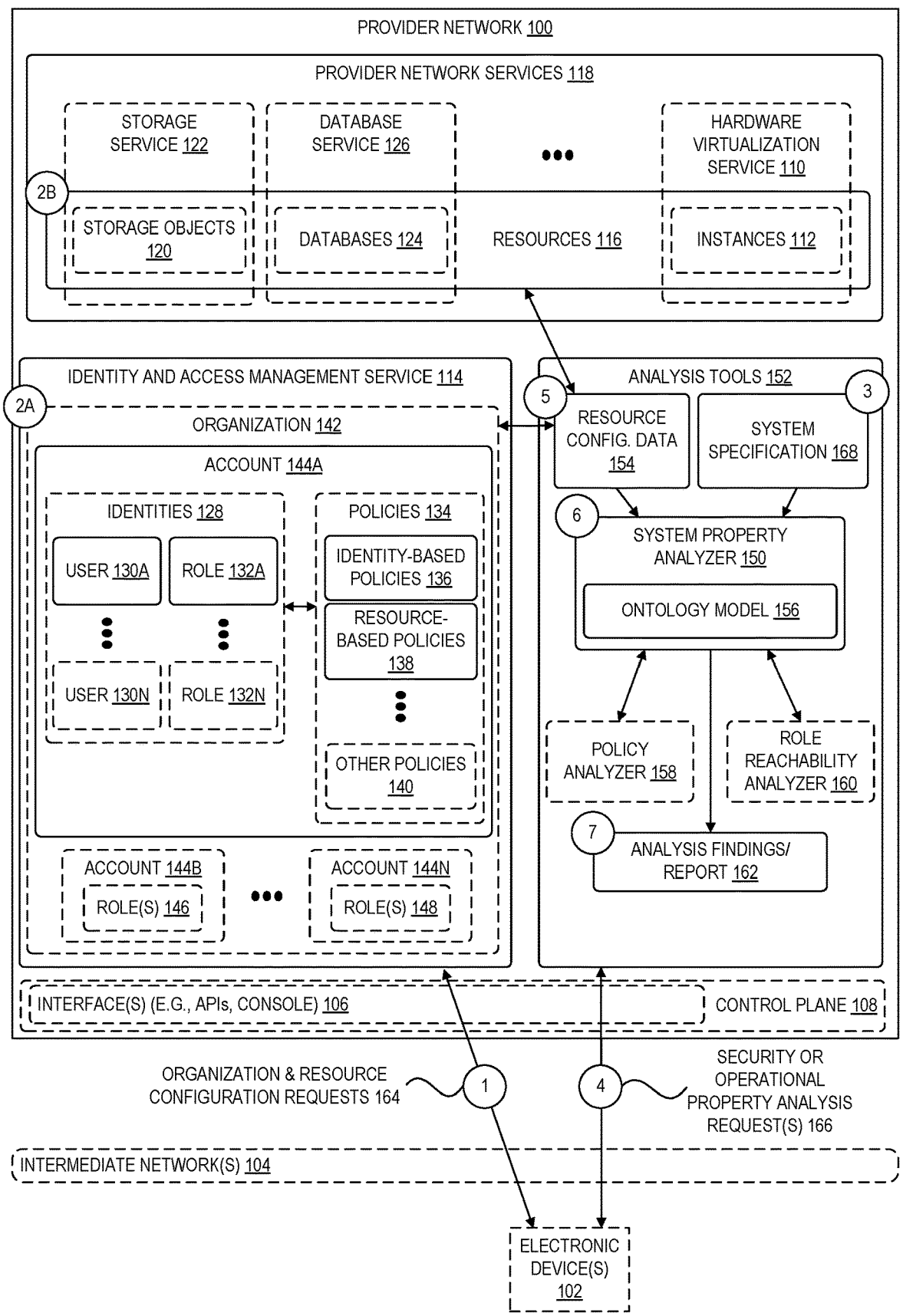
FIG. 1 is a diagram illustrating an environment for providing a domain-specific language and associated framework for generating graph reachability-based analyses for cloud-based system security or operational issues according to some examples.

The present disclosure relates to methods, apparatus, systems, and non-transitory computer-readable storage media for providing a domain-specific language and associated framework for generating graph reachability-based analyses related to computing resources of cloud-based systems or other computing environments. Cloud service providers and other types computing environment providers often enable users to create and configure a wide range of computing system resources including, e.g., accounts, roles, storage resources, compute instances, databases, networking resources etc., as well as to create and configure policies controlling access to and use of such resources. There are numerous ways for users to inadvertently misconfigure such resources and policies that can lead to potential security or operational issues such as, e.g., data disclosure, data tampering, privilege escalation, faulty networking configurations, and the like. Furthermore, many of these issues can arise not only from the misconfiguration of individual resources but from the misconfiguration of policies involving interactions among the computing system resources. Given the large number of computing system resources within many organizations' environments, and often the complex policy relationships among such resources, it can be challenging to identify many types of potential security- or operational-related issues. The consequences of these and other types of issues can be significant as malicious entities can exploit certain types of vulnerabilities to exfiltrate sensitive data, cause operational issues, escalate themselves to access or control critical resources in cloud provider user accounts, and the like.

Some cloud provider networks and other computing environments provide tools used to automate reasoning tasks related to various types of security and operational issues. For example, one way in which such tools can perform such analyses includes the construction of a data or ontology model of an organization's computing system resources and relations among the resources. Once constructed, one or more analyzers can be used to execute queries against the constructed model for defined security- or operational-related scenarios and can provide access to identifiers of affected computing system resources. In this manner, the task of identifying some types of issues can be mapped to a problem of finding nodes (e.g., representing users, roles, computing system resources, etc., within a user's computing environment) in a graph or ontology model where some other certain nodes are reachable (e.g., representing other users, roles, or other computing system resources with defined relationships to the initial node) based on a defined set of cross-resource relations forming the edges of the graph or ontology model.

One challenge with implementing tools for analyzing security and operational issues in this manner is in handling the cross-resource relations included in a graph created to enable a graph-reachability analysis. Existing approaches typically handle cross-resource relations in an ad-hoc manner, for example, by including only a predefined and fixed set of cross-resource relations considered during the generation of an ontology model for analysis. As an example, to create a software-based analyzer for privilege escalation scenarios, a developer might typically hardcode into the analyzer a set of cross-resource relations relevant to that particular analysis (including, e.g., instances where a user or role can assume another role, instances where a user or role can mutate the credentials associated with an account, etc.). The addition of new cross-resource relations (e.g., to modify how a particular type of analysis is performed or to implement an entirely different analysis) thus typically involves modifying the code implementing the analyzer, re-compiling the code for the analyzer, and re-deploying the modified code. These processes cause the development of such analyses to be cumbersome, error-prone, and largely limited to those with intimate knowledge of the code implementing the analysis tools.

To address these challenges, among others, a domain-specific language and associated framework for implementing analyses involving computing system resources is described. The system specification language enables users to readily define the semantics of a set of cross-resource relations of interest using a human-readable analysis specification language. For example, the specification language described herein enables users to express properties over computing system resources based on a user-defined set of cross-resource relations. As indicated, the specification language is human-readable, allowing users to easily add new cross-resource relations or to modify existing relations and properties, thereby enabling users to readily modify existing analyses or to create new ones entirely. The specification language is also machine-readable such that a compiler and other tools can automatically generate an ontology model based on local resource configurations, augment the graph with the cross-resource relations defined in the specifications, and perform graph reachability analyses based on defined properties of interest. Among other benefits, the ability to efficiently perform such analyses enables users to improve the security, operation, and stability of their computing resources and computing environments.

FIG. 1 is a diagram illustrating an environment for using a system specification language to generate graph reachability-based analyses for cloud-based system computing resources. A provider network 100 (or, "cloud" provider network) provides users with the ability to use one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources can be provided as services, such as a hardware virtualization service that can execute compute instances, a storage service that can store data objects, etc. The users (or "customers") of provider networks 100 can use one or more user accounts that are associated with a customer account, though these terms can be used somewhat interchangeably depending upon the context of use. Users can interact with a provider network 100 using electronic device(s) 102 and across one or more intermediate networks 104 (e.g., the internet) via one or more interface(s) 106, such as through use of application programming interface (API) calls, via a console implemented as a website or application, etc. An API refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another. The interface(s) 106 can be part of, or serve as a front-end to, a control plane 108 of the provider network 100 that includes "backend" services supporting and enabling the services that can be more directly offered to customers.

For example, a cloud provider network (or just "cloud") typically refers to a large pool of accessible virtualized computing resources (such as compute, storage, and networking resources, applications, and services). A cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

A cloud provider network can be formed as a number of regions, where a region is a geographical area in which the cloud provider clusters data centers. Each region includes multiple (e.g., two or more) availability zones (AZs) connected to one another via a private high-speed network, for example a fiber communication connection. An AZ (also known as a "zone") provides an isolated failure domain including one or more data center facilities with separate power, separate networking, and separate cooling from those in another AZ. A data center refers to a physical building or enclosure that houses and provides power and cooling to servers of the cloud provider network. Preferably, AZs within a region are positioned far enough away from one another so that a natural disaster (or other failure-inducing event) should not affect or take more than one AZ offline at the same time.

Users can connect to an AZ of the cloud provider network via a publicly accessible network (e.g., the Internet, a cellular communication network), e.g., by way of a transit center (TC). TCs are the primary backbone locations linking users to the cloud provider network and can be collocated at other network provider facilities (e.g., Internet service providers (ISPs), telecommunications providers) and securely connected (e.g., via a VPN or direct connection) to the AZs. Each region can operate two or more TCs for redundancy. Regions are connected to a global network which includes private networking infrastructure (e.g., fiber connections controlled by the cloud provider) connecting each region to at least one other region. The cloud provider network can deliver content from points of presence (or "POPs") outside of, but networked with, these regions by way of edge locations and regional edge cache servers. This compartmentalization and geographic distribution of computing hardware enables the cloud provider network to provide low-latency resource access to users on a global scale with a high degree of fault tolerance and stability.

Generally, the traffic and operations of a provider network can broadly be subdivided into two categories: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, system state information). The data plane includes user resources that are implemented on the provider network (e.g., computing instances, containers, block storage volumes, databases, file storage). Data plane traffic generally includes non-administrative operations, such as transferring user data to and from the user resources. The control plane components are typically implemented on a separate set of servers from the data plane servers, and control plane traffic and data plane traffic can be sent over separate/distinct networks.

To provide these and other computing resource services, provider networks 100 often rely upon virtualization techniques. For example, virtualization technologies can provide users the ability to control or use compute resources (e.g., a "compute instance." such as a VM using a guest operating system (O/S) that operates using a hypervisor that might or might not further operate on top of an underlying host O/S, a container that might or might not operate in a VM, a compute instance that can execute on "bare metal" hardware without an underlying hypervisor), where one or multiple compute resources can be implemented using a single electronic device. Thus, a user can directly use a compute resource (e.g., provided by a hardware virtualization service) hosted by the provider network to perform a variety of computing tasks. Additionally, or alternatively, a user can indirectly use a compute resource by submitting code to be executed by the provider network (e.g., via an on-demand code execution service), which in turn uses one or more compute resources to execute the code—typically without the user having any control of or knowledge of the underlying compute instance(s) involved.

An on-demand code execution service (referred to in various examples as a function compute service, functions service, cloud functions service, functions as a service, or serverless computing service) can enable users of the provider network 100 to execute their code on cloud resources without having to select or manage the underlying hardware resources used to execute the code. For example, a user can use the on-demand code execution service by uploading their code and use one or more APIs to request that the service identify, provision, and manage any resources required to run the code.

The hardware virtualization service 110 (referred to in various implementations as an elastic compute service, a virtual machines service, a computing cloud service, a compute engine, or a cloud compute service) can enable users of the provider network 100 to provision and manage compute resources such as virtual machine instances. Virtual machine technology can use one physical server to run the equivalent of many servers (each of which is called a virtual machine), for example using a hypervisor, which can run at least on an offload card of the server (e.g., a card connected via PCI or PCIe to the physical CPUs) and other components of the virtualization host can be used for some virtualization management components. Such an offload card of the host can include one or more CPUs that are not available to user instances, but rather are dedicated to instance management tasks such as virtual machine management (e.g., a hypervisor), input/output virtualization to network-attached storage volumes, local migration management tasks, instance health monitoring, and the like). Virtual machines are commonly referred to as compute instances or simply "instances." As used herein, provisioning a virtual compute instance generally includes reserving resources (e.g., computational and memory resources) of an underlying physical compute instance for the client (e.g., from a pool of available physical compute instances and other resources), installing or launching required software (e.g., an operating system), and making the virtual compute instance available to the client for performing tasks specified by the client.

A container service can be a container orchestration and management service (referred to in various implementations as a container service, cloud container service, container engine, or container cloud service) that allows users of the cloud provider network to instantiate and manage containers. In some examples, the container service can be a Kubernetes-based container orchestration and management service (referred to in various implementations as a container service for Kubernetes. Azure Kubernetes service, IBM cloud Kubernetes service. Kubernetes engine, or container engine for Kubernetes). A container, as referred to herein, packages up code and all its dependencies so an application (also referred to as a task, pod, or cluster in various container services) can run quickly and reliably from one computing environment to another. A container image is a standalone, executable package of software that includes everything needed to run an application process: code, runtime, system tools, system libraries and settings. Container images become containers at runtime. Containers are thus an abstraction of the application layer (meaning that each container simulates a different software application process). Though each container runs isolated processes, multiple containers can share a common operating system, for example by being launched within the same virtual machine. In contrast, virtual machines are an abstraction of the hardware layer (meaning that each virtual machine simulates a physical machine that can run software). While multiple virtual machines can run on one physical machine, each virtual machine typically has its own copy of an operating system, as well as the applications and their related files, libraries, and dependencies. Some containers can be run on instances that are running a container agent, and some containers can be run on bare-metal servers, or on an offload card of a server.

In some examples, an identity and access management service 114 is a service that enables users to securely control access to cloud provider network resources (e.g., computing resources 116 associated with various provider network services 118, such as storage objects 120 associated with a storage service 122, databases 124 associated with a database service 126, compute instances 112 associated with a hardware virtualization service 110, and the like). The identity and access management service 114 is broadly used to control who is permitted to authenticate (e.g., sign in) with the cloud provider network 100 and who is authorized (e.g., has permissions) to use resources provided by the cloud provider network. In general, a resource is a concept used to capture the domain of items that can be created, read, modified, or deleted by customers in a cloud provider network 100. Examples of resources also include identities (e.g., identities 128, including example users 130A, . . . , 130N and roles 132A, . . . , 132N) and policies 134 (e.g., including identity-based policies 136, trust policies 138, and other policies 140). FIG. 1 further illustrates the concept of an organization 142, which can include any number of associated accounts 144A, 144B, . . . , 144N, which can further include any number of users and roles (e.g., role(s) 146 associated with account 144B and role(s) 148 associated with account 144N).

When a person initially creates an account with the cloud provider network 100, the person may begin with a single sign-in identity that has complete access to all cloud provider network services and resources associated with the account (e.g., a root user of identities 128). For example, the root user identity may be accessed by signing in with a username (e.g., an email address) and a password used to create the account. Cloud provider networks 100 often advise users not to use a root user for most tasks and instead to create additional user accounts with defined permissions (e.g., including one or more of users 130A, . . . , 130N). In some examples, a user can grant different permissions to different user accounts for different resources. For example, a user account might be configured to allow some users complete access to a hardware virtualization service 110, a storage service 122, and other cloud provider network 100 resources. For other users, a user account might allow read-only access to some storage buckets, or permission to administer some instances 112, etc.

In some examples, an account can include identity-related objects stored as part of the identity and access management service 114 including, for example, users 130A, . . . , 130N, user groups (not illustrated), roles 132A, . . . , 132N, policies 134, and the like. These resources can be added, edited, and removed by users of the cloud provider network 100 with sufficient privileges, e.g., using a web-based console, API, CLI, or other interface provided by the identity and access management service 114.

In some examples, a principal represents a person or application that can make a request for an action or operation on a resource of the cloud provider network 100 (e.g., a resource 116 or a resource of the identity and access management service 114) via one or more identities, although sometimes the term principal can be used interchangeably with an identity. The set of identities 128 associated with an account 144A can include any number of users 130A, . . . . 130N and roles 132A, . . . . 132N. A cloud provider network request occurs when a principal uses an identity (e.g., a user or a role) to send a request for an action or operation on a resource. A request can include some or all of the following information: the action or operations that the principal wants to perform, the resource object upon which the actions or operations are performed, the person or application that used an identity (e.g., a user or role) to send the request, environment data (e.g., information about the IP address, user agent, SSL enabled status, time of day, etc.), and resource data (e.g., data related to the resource that is being requested, such as a resource identifier, or a tag name). In some examples, the identity and access management service 114 gathers the information contained in a request into a request context, which is used to evaluate and authorize the request.

For some requests to be completed, the identity and access management service 114 determines whether the requesting principal is authorized (e.g., permitted) to complete the request. During authorization, the identity and access management service 114 uses values included in the request context to check for policies that apply to the request (e.g., one or more of policies 134). The identity and access management service 114 uses the policies 134 to determine whether to allow or deny the request. In some examples, the policies are stored by the identity and access management service 114 as JavaScript Object Notation (JSON) documents (or using any other data format) and specify the permissions for particular identities. In some examples, there are several types of policies 134 that can affect whether a request is authorized including, e.g., identity-based policies 136, trust policies 138, among other policies 140. For example, to provide users with permissions to access resources in their own account, identity-based policies can be configured, while resource-based policies may be used for granting cross-account access to resources. In some examples, the identity and access management service 114 checks each policy that applies to the context of a request. If a single permissions policy includes a denied action, the identity and access management service 114 denies the entire request. In some examples, an identity and access management service 114 denies requests by default, such that a request is authorized only if every part of a request is allowed by applicable permissions policies.

Once a request is authenticated and authorized, the identity and access management service 114 approves the actions or operations in the request. Operations are defined by a service and include actions that can be performed on or relative to a resource, such as viewing, creating, editing, and deleting that resource. For example, the identity and access management service 114 may support actions such as CreateUser, DeleteUser, CreateRole, and AssumeRole, among many other possible actions. A hardware virtualization service 110 can support actions such as launching a VM instance, deleting a VM instance, etc. To allow a principal to perform an operation, the action is included in a policy that applies to the principal or the affected resource.

In some examples, identity-based policies 136 are permissions policies that are attached to an identity, such as a user, group, or role in an account. In some examples, resource-based policies 138 are permissions policies that are attached to a resource such as a storage object 120 or a role trust policy. A resource-based policy controls what actions a specified principal can perform on that resource and under what conditions. In some examples, the identity and access management service 114 further supports trust policies, which can be attached to a role (e.g., one or more of roles 132A, . . . , 132N). Because a role is both an identity and a resource that supports resource-based policies, in some examples, both a trust policy and an identity-based policy is attached to a role. Trust policies define which principal entities (accounts, users, roles, and federated users) can assume the role.

A role is an identity that a user creates in an account that has specific permissions. A role is similar to a user, in that it is an identity with permission policies that determine what the identity can and cannot do. However, instead of being uniquely associated with one person, a role is intended to be assumable by anyone who needs it. Also, a role may not have standard long-term credentials such as a password or access keys associated with it. Instead, when a principal assumes a role, it is provided with temporary security credentials for a role session. Roles can be used to delegate access to users, applications, or services that do not normally have access to the resource. For example, a person might want to grant users in an account access to resources those users do not usually have access to, or grant users in one account access to resources in another account.

As indicated herein, it is desirable to enable users to perform graph reachability-based analyses to identify various types of cloud-based system security and operational issues within users' organizations or other collections of computing resources. As one example, a user might desire to use analysis tools 152 to perform an analysis to identify the existence of potential privilege escalation scenarios within an organization 142 or other group of identities. In this context, a privilege escalation scenario can exist when a principal is able to use an identity (e.g., one or more of identities 128) to gain access to resources or actions that exceed a level intended for the identity, e.g., based on the misconfiguration of one or more associated policies 134. As another example, a user might desire to identify particular computing system resources with specified cross-resource properties, e.g., storage resources that are not currently configured to log data to another storage resource, compute resources that generate unencrypted data, and the like. In general, an analysis can include any type of property for which a user desires to identify instances of computing system resource(s) that either satisfy or fail to satisfy the property.

According to examples described herein, to a system property analyzer 150 is provided to enable the performance of these any other types of analyses. In some examples, a system property analyzer 150 is provided as part of analysis tools 152 of the cloud provider network 100.

As described in more detail herein, as part of an analysis performed by a system property analyzer 150, resource configuration data 154 is obtained describing a set of computing system resources (e.g., compute resources, storage resources, users, roles, etc.) and associated policy configuration information (e.g., policies 134). Users can further define a system specification 168 using a human-readable, domain-specific language for defining analyses. The system specification 168 is human readable in the sense that conforms to a grammar that is close to spoken English grammar and that enables users to easily grasp and use it compared to, e.g., a lower-level query or programming language. Examples of the grammar for the specification language are provided hereinafter. Based on the resource configuration data 154 and system specification 168, the system property analyzer 150 builds an ontology model 156 representing the computing system resources under analysis and relationships among the computing system resources, performs an analysis defined by the system specification 168, and generates analysis findings or report 162 based on the analysis.

In some examples, the performance of computing system resource or component property analyses can involve the use of a policy analyzer 158, role reachability analyzer 160, or other tools or combinations thereof representing automated reasoning services used to analyze policies and consequences of policies. A policy analyzer 158, for example, implements software-based logic used to translate policies 134 into a mathematical language and then use automated reasoning tools to check properties of the policies. The tools used by a policy analyzer 158 can include automated reasoners, also called Satisfiability Modulo Theories (SMT) solvers, which use a mix of numbers, strings, regular expressions, dates, and IP addresses to prove and disprove logical formulas. With these tools, the policy analyzer 158 can compare a given policy A against a "probe" policy to determine whether policy A is more permissive than the probe policy. For example, to determine whether an identity A is permitted to mutate the credentials associated with a role B, the policy analyzer 158 can be used to compare a policy associated with identity A against a probe policy that does permit mutating the credentials associated with B. This information, for example, can be added to an ontology model to indicate types of actions that can be performed among a set of identities. Similar to the policy analyzer 158, a role reachability analyzer 160 can be used to analyze policies to determine which roles are reachable from which identities (e.g., other roles or users) within a set of identities, again relying on analysis of policies using automated reasoning techniques. This information can similarly be added to an ontology model to build an understanding of the relationships among a set of computing system resources under analysis.

The circles labeled "1"-"6" in FIG. 1 illustrate a high-level process for performing analyses of computing system resources (or more broadly of any computing related components such as software applications, hardware components, servers, compute instances, storage resources, databases, etc.) based on a user-created system specification conforming to a domain-specific language for graph reachability-based property analyses. At circle "1." for example, one or more users associated with an organization 142 use electronic device(s) 102 to generate organization and resource configuration request(s) 164 to configure a set of accounts, identities, policies, etc., associated with an organization (e.g., an organization 142), to configure policies 134 associated with some or all those resources, and to create and configure various computing resources 116. The identities, for example, may be created to provide authentication for users and processes within accounts (e.g., accounts 144A, . . . , 144N) of the cloud provider network 100. As indicated above, identities can be authenticated and then authorized to perform actions in the cloud provider network 100 and each identity can be associated with one or more policies 134 to determine what actions a user or role can do with which cloud provider network resources and under what conditions. The collection of accounts, identities, computing resources, and policies can be created over a period of days, months, or years, for example, by an organization that intends to use various services of the cloud provider network 100 for various purposes. Furthermore, the collection of accounts, identities, computing resources, and policies comprising an organization may be modified over time as desired by the organization.

In some examples, at circles "2A" and "2B." responsive to the organization and resource configuration request(s) 164, the identity and access management service 114 and provider network services 118 create and store data corresponding to the accounts, identities, computing resources, and policies configured by one or more users. As indicated above, these identities, computing resources, and policies can be added, edited, and removed by external users of the cloud provider network 100 with sufficient privileges, e.g., using a web-based console, API, CLI, or other interface provided by the identity and access management service 114 and provider network services 118, and data representing the identifies, computing resources, policies can be stored using various types of storage resources managed by the services.

In some examples, at circle "3." a user creates a system specification 168. The system specification 168 generally defines the semantics of a set of cross-resource relations of interest (e.g., relations among one or more organization's identities 128, resources 116, or both) and further specifies one or more computing system resource-related properties that a user desires to verify with reference to the defined set of cross-resource relations. As one example, a user desiring to analyze a set of identities 128 for potential privilege escalation scenarios can define in a system specification 168 cross-resource relations relevant to a privilege escalation analysis (e.g., instances of a user or role assuming another role, instances of a resource that permits a role to mutate credentials associated with the resource, etc.). The user can further use the specification language to define a relevant property to check, e.g., that no principal exists where another principal can transitively access the principal, where the principal can perform certain defined actions leading to privilege escalation scenarios. In general, the type of analysis that can be performed can include any analysis that can be expressed as a graph-reachability problem involving one or more computing system resources or computing-related components.

In some examples, a user can create a system specification 168 as a text file or other type of data generated using a text editor, source code editor, a web-based console, or any other application that can be used to create the text-based specification. As indicated, a system specification 168 can be both human-readable, in that users can create, analyze, and readily understand text-based specifications of cross-resource relations and associated policies, and machine-readable, in that the system specification 168 can be provided to a system property analyzer 150 for the automatic generation of analyses based on the user-created specifications.

In some examples, the specification language used to create a system specification 168 is designed relative to a domain model defining services of a cloud provider network 100 and their corresponding resources of interest (e.g., compute resources, storage resources, network resources, users, roles, etc.). For example, a resource can be described in the specification language by a set of attributes with values ranging over a type. The specification language can also allow users to express properties that the user expects to hold for all instances of a resource type. The specification language further enables users to identify different cases where a system property analyzer 150 determines that a specified property does not hold and to optionally assign a reason and severity level for each case (e.g., each pass or failure condition). The following is an example template for a system specification:

for all service_name:resource_type variable verify <pass_conditions>
identify pass set reason "some reason you would like to see for the check to pass" with <severity_type>severity
identify fail when <fail_conditions 1> set reason "some reason that describes the failing case" with <severity_type>severity
identify fail when <fail_conditions2> set reason "some reason that describes the failing case" with <severity_type>severity As shown above, the template enables users to create specifications for various types of computing system resources, where a specification allows a user to specify a condition that the user desires to verify is true for any such computing system resources in a set of resources under analysis. As indicated, part of a system specification 168 further includes the specification of cross-resource relations of interest to the analysis. Examples of the types of relations that a user can specify include, e.g., a "logs to" relation, an "allows action" relation, a "trusts entity" relation, a "can access" relation, among other possibilities. To define a cross-resource relation, a user creates specification data identifying a resource type (e.g., a storage resource, compute resource, networking resource, etc.) and further uses a variable (e.g., x) to represent any resource of that type. The user then provides a name of the relation of interest (for example, the relation "logs to" can be used to represent a relation where one resource logs to another resource).

In some examples, the conditions of the cross-resource relations and property specifications can be defined based on properties associated with the resources. For example, a storage resource of type "bucket" might a property "bucket_logging_configuration". That property might further have a sub-property "bucket_name", and so forth. In some examples, these properties can be derived from a programming model (e.g., a software development kit (SDK)) associated with the resources.

An example of a cross-resource relation, the following is a "logs to" relation defined between two storage resources:
SS:Bucket X logs to SS:Bucket Y when {
X.bucket_logging_configuration.destination_bucket_name is Y.bucket_name}

In the example above, "SS" refers to a storage service that provides storage resources referred to as "buckets." The relation above thus indicates that the user is interested in cases where a storage bucket X logs to a storage bucket Y, where the relation exists when the property "bucket_logging_configuration.destination_bucket_name" for the storage bucket X is the same as the property "bucket_name" for a storage bucket Y. In this example, when the system property analyzer 150 identifies any resources x and y satisfying the condition, the system property analyzer can add a relation in the ontology model from a resource x to y with the cross-resource relation named "logs to."

As another example, consider the following example of a "can access" relation between two principals:
Principal X can access Principal Y when {
X allows action "sts: AssumeRole" on Y and
Y trusts X
}

In this example, the relation indicates that the user is interested in cases where a Principal X (e.g., a user or a role) can access another Principal X, where the relation exists when the Principal X allows the action "sts: AssumeRole" and Principal Y trusts X (e.g., where these conditions can be determined by the system property analyzer 150 by analyzing policy information associated with each principal under analysis). In general, a user can specify any number of separate cross-resource relations of interest to a particular type of analysis.

Below is an example of a system specification requesting verification of whether all storage volumes associated with VM instances are encrypted:
for all HVS: Volume X verify X.encrypted is true
identify pass set reason "Volume is encrypted." with HIGH severity
identify fail when X.encrypted is false set reason "Volume is not encrypted." with HIGH severity In some examples, a user might desire to express the existence of an instance of a resource or a conditional value of an attribute. The specification language supports there-exists-where and if-then constructs for these purposes. For example, the following specification includes a there-exists-where construct:
for all HVS:Subnet X verify there exists HVS: Flowlog Y where {Y.attached_resource_id is X.subnet_id}
identify pass set reason "HVS Subnet has Flowlog." with LOW severity
identify fail when there exists no HVS:Flowlog Y where{Y.attached_resource_id is X.subnet_id} set reason "HVSSubnet without Flowlog." with LOW severity Returning to FIG. 1, at circle "4," the system property analyzer 150 receives a request 166 to analyze a collection of computing system resources according to a provided system specification 168. The request can be generated by a user using a web-based console, API, CLI, or any other interface in which a user can identify a relevant set of computing system resources for analysis (e.g., by specifying an entire organization or by selectively identifying computing system resources of interest). In some examples, a request 166 further identifies a system specification 168 to use for the analysis.

In some examples, at circle "5," the system property analyzer 150 obtains resource configuration data 154 related to the computing system resources (e.g., users, roles, storage objects, VM instances, etc.) to be analyzed according to the system specification 168. The resource configuration data 154 generally includes any type of data describing a defined set of accounts, identities, and associated resources (e.g., policies, etc.). In some examples, the system property analyzer 150 obtains the resource configuration data 154 using a separate "scanner" service that is configured to scan an identified set of computing system resources, identify relevant policies and other resources, and collect the data into a textual format for analysis (e.g., a listing of all relevant computing system resources, copies or identifiers of relevant policies, etc.). In some examples, the system property analyzer 150 can obtain information about only those computing system resources relevant to the identified system specification 168 (e.g., if the system specification involves only users, roles, and VM instances, the system property analyzer 150 can request resource configuration data 154 for only those types of resources).

At circle "6." the system property analyzer 150 creates an ontology model 156 representing the resource configuration data 154. As indicated above, the ontology model 156 generally represents a set of computing system resources (users, roles, compute resources, storage resources, etc.) under analysis and cross-resource relations of interest among the computing system resources. As indicated above, the cross-resource relations can be defined in the system specification 168 and can include, for example, types of actions that are permitted to be performed by a first computing resource A to a second computing resource B (where the second computing resource can be the same computing resource). Example cross-resource relationships of interest can include, but are not limited to, logs to relationships, allows action relationships, permissions mutation relationships (e.g., based on various types of actions that enable one identity to "mutate" permissions associated with another identity), credential mutation relationships (e.g., based on various types of actions that enable one identity to mutate the credentials associated with another identity), can access relationships (e.g., based on actions that enable an identity to access another identity or resource), role assumption relationships (e.g., based on the ability for one identity to assume another role), and the like. As indicated above, the existence of such relationships can be identified by analyzing pairs of computing system resources including the resource configuration data 154 and associated policies to determine whether each such type of relationship exists (e.g., using a system policy analyzer 158 to determine whether an identity can perform an action to another identity based on the policies associated with the identities).

In some examples, the ontology model 156 is defined as a directed graph using a data model used to describe and model information such as, for example, the Resource Description Framework (RDF). RDF Schema (RDFS). Web Ontology Language (OWL), or other format. The vertices of the directed graph represent computing system resources under analysis, while edges in the graph are used to indicate particular types of relationships between the computing system resources, as described above. In some examples, the directed graph can be built incrementally as analyses of pairs of computing system resources is performed and relationships are identified, or as other relevant information is obtained.

Figure 2:
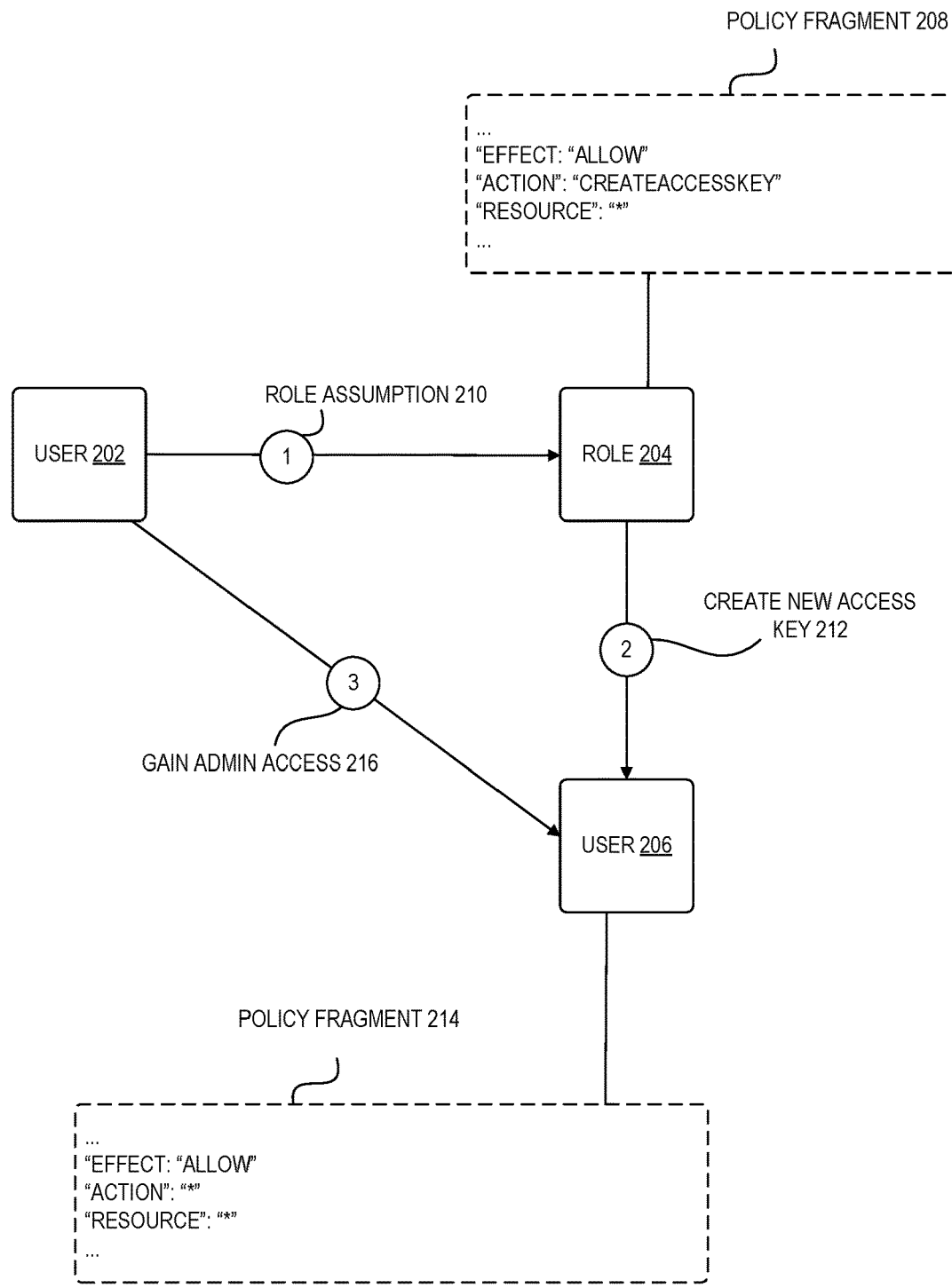
FIG. 2 is a diagram illustrating an example cross-resource relations resulting in a privilege escalation scenario in which a user or role can mutate identity and access management state to add permissions directly or indirectly to itself to gain elevated privileges according to some examples.
Figure 3:
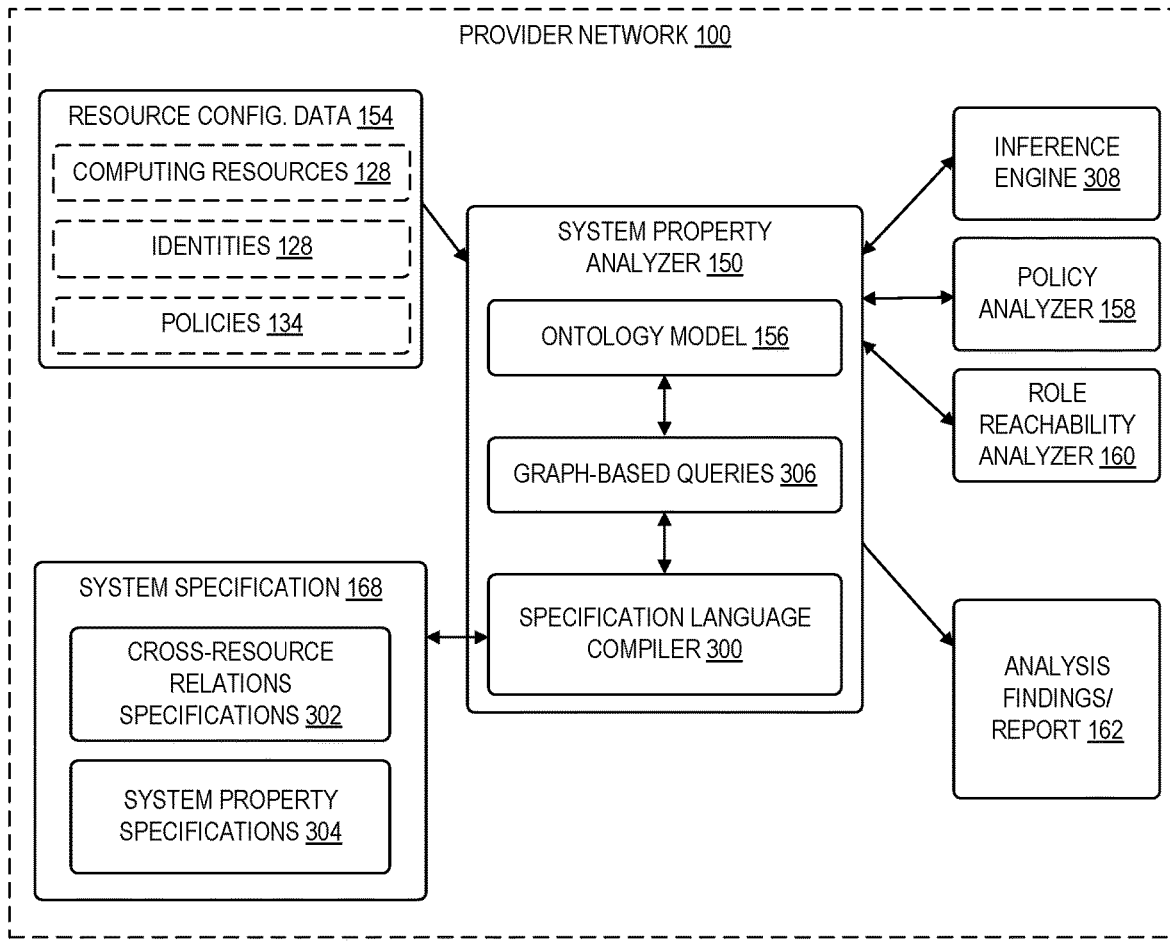
FIG. 3 is a diagram illustrating an environment in which a system property analyzer performs a graph reachability-based analysis on a provided system specification according to some examples.

FIG. 2 illustrates an example of cross-resource relations that can exist based on various types of relationships among identities as described above. FIG. 2, for example, includes a graph illustrating a credential mutation scenario in which a user 202 is able to assume a role 204, use the role 204 to create a new access key for a different user 206, and subsequently gain access to the user 206 using the newly created access key. As shown in FIG. 2, for example, the role 302 has attached to it a policy including the policy fragment 208 that enables the role 204 to create a new access key on any resource. Thus, at circle "1." a user 202 with permissions to assume 210 the role 204 can, at circle "2." create a new access key 212 for the user 206. The user 206 is attached to a policy including a policy fragment 214 granting administrative privileges to the user 206. Using the newly created access key, the user 202 can then, at circle "3." gain administrative access 216 by accessing user 206. Although FIG. 3 illustrates an example of a user exploiting access to a create access key action, many other types of actions can also result in a credential mutation scenario such as an update login profile action, an update development endpoint action, and the like. The use of a system specification 168 enables users to specify these and other types of scenarios of interest such that the system property analyzer 150 can construct and perform analyses of a set of computing system resources for the existence of the scenarios.

FIG. 3 illustrates additional details related to the use of a system property analyzer 150 to analyze a collection of computing system resources for one or more properties defined within a system specification. As indicated, in some examples, the system property analyzer 150 can use one or more tools to scan one or more accounts of a cloud provider network 100 (e.g., accounts associated with a user requesting an analysis) for resource configurations of interest to obtain resource configuration data 154. Based on the resource configuration data 154, the system property analyzer 150 can generate an initial ontology model 156, e.g., including nodes representing computing system resources identified in the resource configuration data 154. In some examples, the resources initially added to the ontology model 156 can include only those resources relevant to an analysis being conducted, e.g., as specified in a system specification 168.

As indicated above, a user can create a system specification 168 using a text editor, source code editor, a web-based console, or any other type of application. The system property analyzer 150 obtains the system specification 168 and uses a specification language compiler 300 to generate graph-based queries 306. In some examples, the graph-based queries can be executed against the ontology model 156 using an inference engine 308. The user can provide the system specification 168 by importing one or more files to the system property analyzer 150, As indicated, the system specification 168 broadly includes at least two specifications: cross-resource relations specifications 302 and system property specifications 304.

For example, the specification language compiler 300 can generate first graph-based queries (e.g., SPARQL Protocol and RDF Query Language (SPARQL) queries) derived from the cross-resource relations specifications 302, where such queries are used to augment the ontology model 156 of the computing system resources. These queries determine, based on the conditions specified for the cross-resource relations, relations to add among the resources in the ontology model 156. The specification language compiler 300 further generates queries 306 from the system property specifications 304, which refer to the cross-resource relations specifications 302 previously added to the ontology model 156. In some examples, execution of these queries 306 identifies resources from the ontology model 156 that are either compliant or non-compliant based on the specified properties, as illustrated in the examples above, to obtain analysis findings or report 162.

As indicated, the ontology model 156 can be constructed as a labeled, directed graph. The system property analyzer 150, for example, can create the graph including vertices corresponding to the identities under analysis and edges representing various types of relationships among the identities (e.g., access relationships, permission mutation relationships, credential mutation relationships, etc.). By representing resource configuration data 154 in this manner, a process for identifying computing resources-related properties can be represented as a graph reachability problem.

Figure 4:
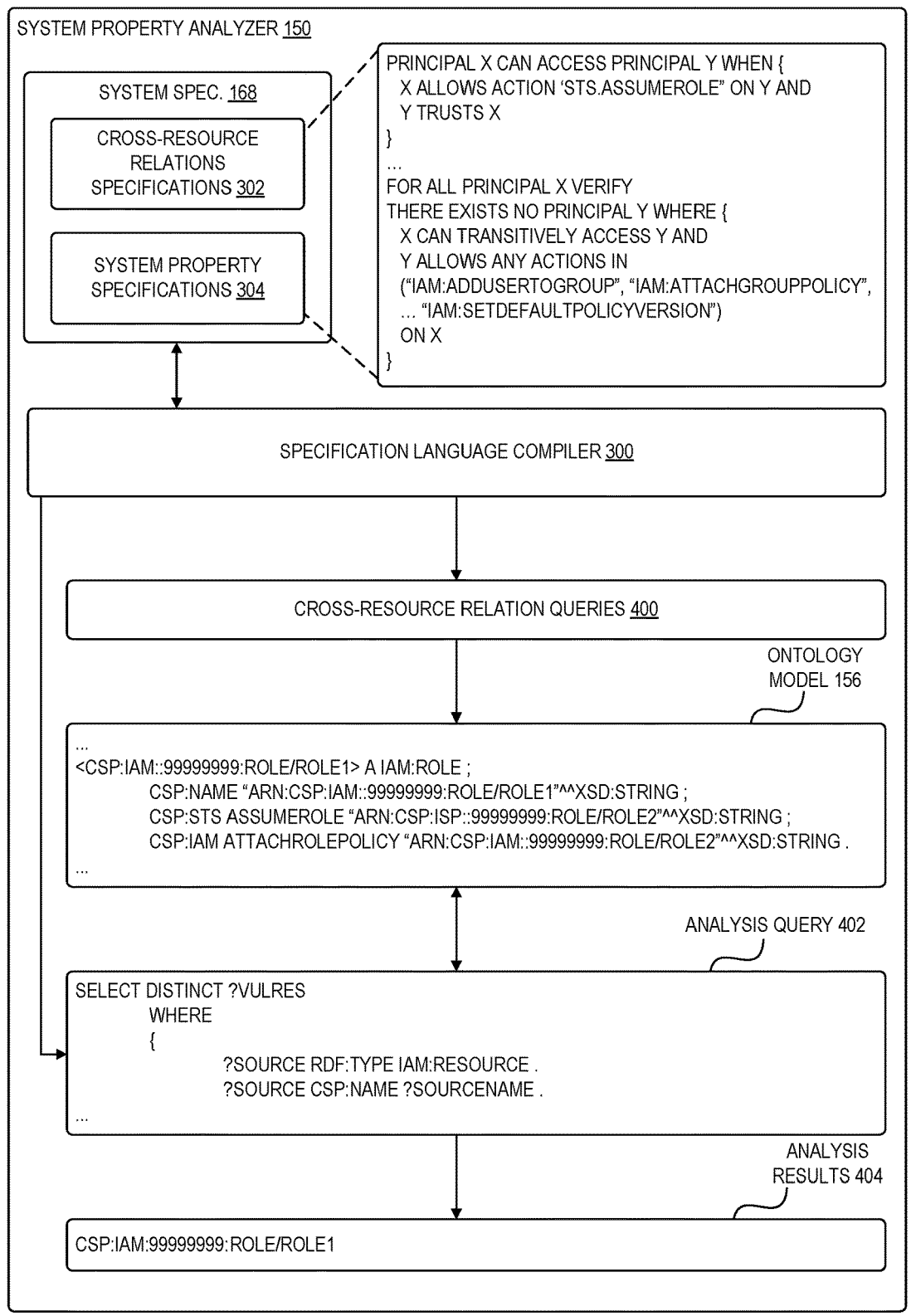
FIG. 4 illustrates an example workflow of a system property analyzer generating, based on a system specification, an ontology model representing a set of entities and querying the ontology model to obtain analysis results according to some examples.

FIG. 4 illustrates an example workflow of a computing resources property analyzer generating, based on a system specification, an ontology model representing a set of entities and querying the ontology model to obtain analysis results 404 according to some examples. As shown, a system specification 168 includes cross-resource relations specifications 302 and system property specifications 304. The system specification 168 is provided to the specification language compiler 300 for translation into one or more sets of queries including, e.g., cross-resource relation queries 400 and an analysis query 402.

In some examples, an ontology model 156 includes data stored as a collection of triples using, e.g., the Resource Description Framework (RDF) format, Web Ontology Language (OWL) format, or any other graph-based representation of the data. Each triple, for example, can express information obtained from the system property analyzer 150, policy analyzer 158, or other sources, as described above, indicating that a first computing system resource is permitted to perform an action (e.g., an attach policy action, role assumption action, etc.) involving a second computing system resource. For example, a specification in the system specification 168 indicating that a resource x trusts a computing resource y can be compiled into a cross-resource relation query 400 used to identify that relationship among the computing resources, possibly in coordination with the various other policy analysis services, role reachability analysis services, etc.

The system specification 168 defines one or more patterns of interest in an ontology model 156 generated based on the cross-resource relation specifications 302. In the example of FIG. 4, a user has defined a "can access" relation between principals. In the example system property specification 304, the analysis indicates an interest in principals that can transitively access another principal and further where a principal Y can perform one or more actions to escalate its privileges.

In some examples, the specification language compiler 300 includes functionality for performing validation mutation checks, syntactic issues, etc. The compiler can also perform other types of validations of specifications, e.g., if a specification refers to a storage resource and an associated property of the storage resource, the compiler can check whether the specified property is valid for that type of resource. In some examples, the compiler is provided in a graphical user interface (GUI) with property completion, syntax checking, etc., included in the interface. Users of the compiler can include, e.g., security engineers performing security reviews, external customers performing reviews of their own resources, etc.

In some examples, the analysis of computing system-related properties based on a system specification 168 can be an iterative process, where a user runs multiple analyses based on an overlapping ontology model. For example, a user can execute a first analysis based on a first version of a system specification. Once executed, the user might notice that one or more additional cross-resource relations are relevant to the analysis. The user can thus provide input modifying the initial system specification to obtain an updated system specification. The user can then re-execute the analysis using the updated system specification, where the system property analyzer 150 can update the ontology model based on the updated system specification and can further execute a query against the updated ontology model. Users can similarly update system property specifications and other aspects of the analysis for iterative development purposes.

Returning to FIG. 1, at circle "7," the system property analyzer 150 provides access, in the form of analysis findings or report 162, to identifiers of any computing system resources identified as being compliant with a property defined in the system specification, resources identified as being non-compliant with a property, or combinations thereof. In general, the identifiers of computing system resources identified as being associated with an analysis scenario can be provided in any format including, e.g., as identifiers in response to an API request, in text format, in a graphical interface, etc.

Figure 5:
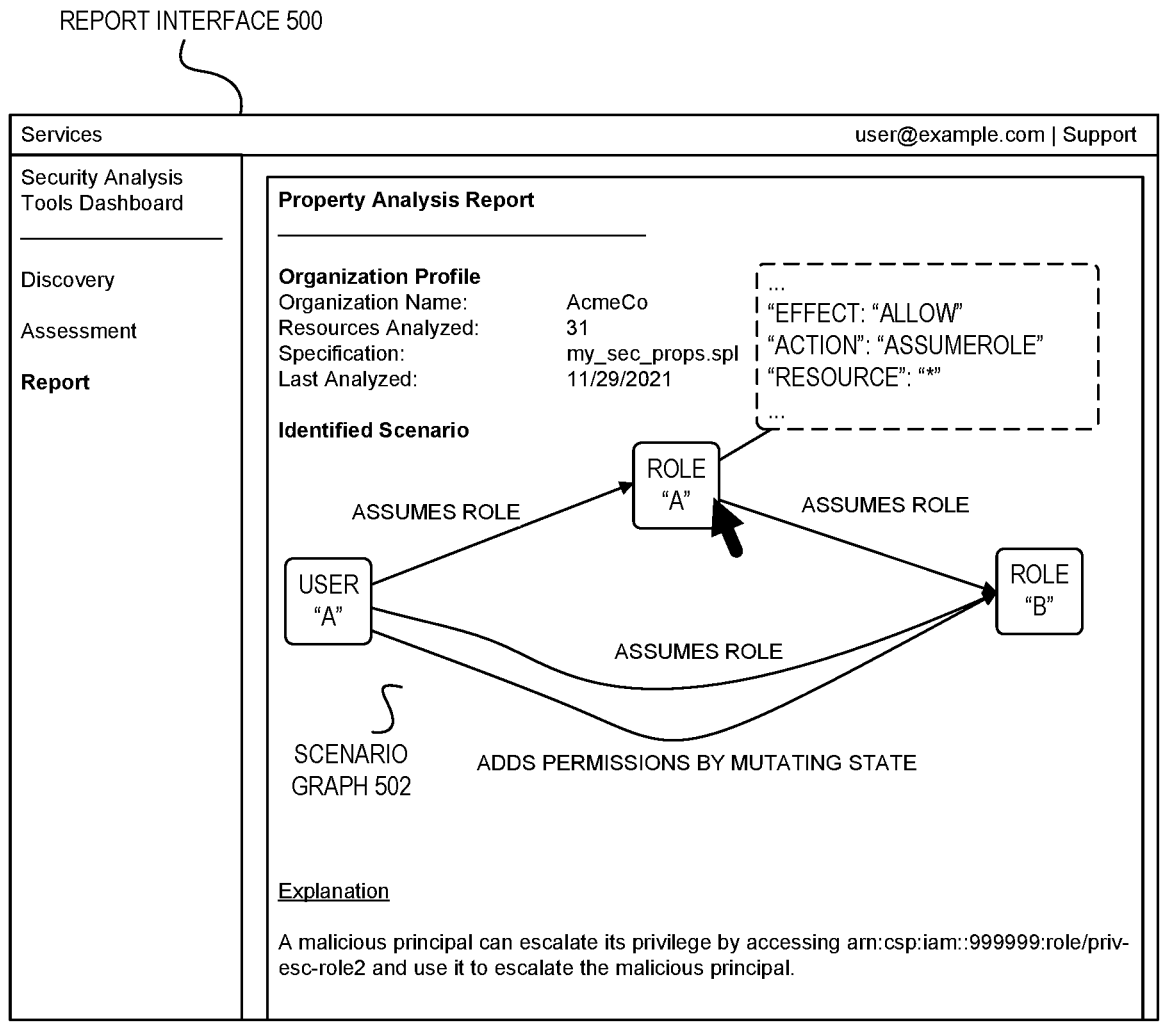
FIG. 5 illustrates an example interface displaying system property findings based on a graph reachability-based analysis derived from a system specification according to some examples.

FIG. 5 illustrates an example interface displaying analysis findings generated by a system property analyzer according to some examples. As shown, the report interface 500 includes a system property analysis report providing information about a completed analysis on a set of computing system resources. In this example, the report interface 500 illustrates one identified scenario, displayed as a scenario graph 502, including a representation of the identities involved (e.g., a user "A", role "A", and role "B") and relationships among the identities. The relationships identify actions that can be performed to escalate the privileges associated with the user "A", including the user assuming each of role "A" and role "B" in a role chain, and adding permissions by mutating the state of the role "B". In some examples, a scenario graph 502 further enables users to hover over elements in the graph (e.g., the node representing role "A") to obtain additional information about the scenario, e.g., to view snippets of policies and policy statements causing the privilege escalation scenario to exist.

The report interface 500 further includes a textual explanation of the identified scenarios. Although only one scenario is depicted in the example, such a report interface can display any number of separately identified analysis findings involving any number of separate computing system resources. As indicated above, although a graphical report interface is shown, identifiers of identities associated with analysis scenarios can be provided in other forms including as an API response, in text, etc.

In some examples, based on one or more identified computing system resources associated with a finding, users can provide input to modify one or more policies to mitigate the identified scenario(s). For example, using a web-based console or other interface, a user can be directed to the policy fragment(s) causing the scenario to exist and be provided with interface elements that enable the user to modify the fragments. In some examples, the system property analyzer 150 can provide suggested modifications to a policy to correct one or more identified findings, which can be selected by a user for implementation, if desired.

Figure 6:
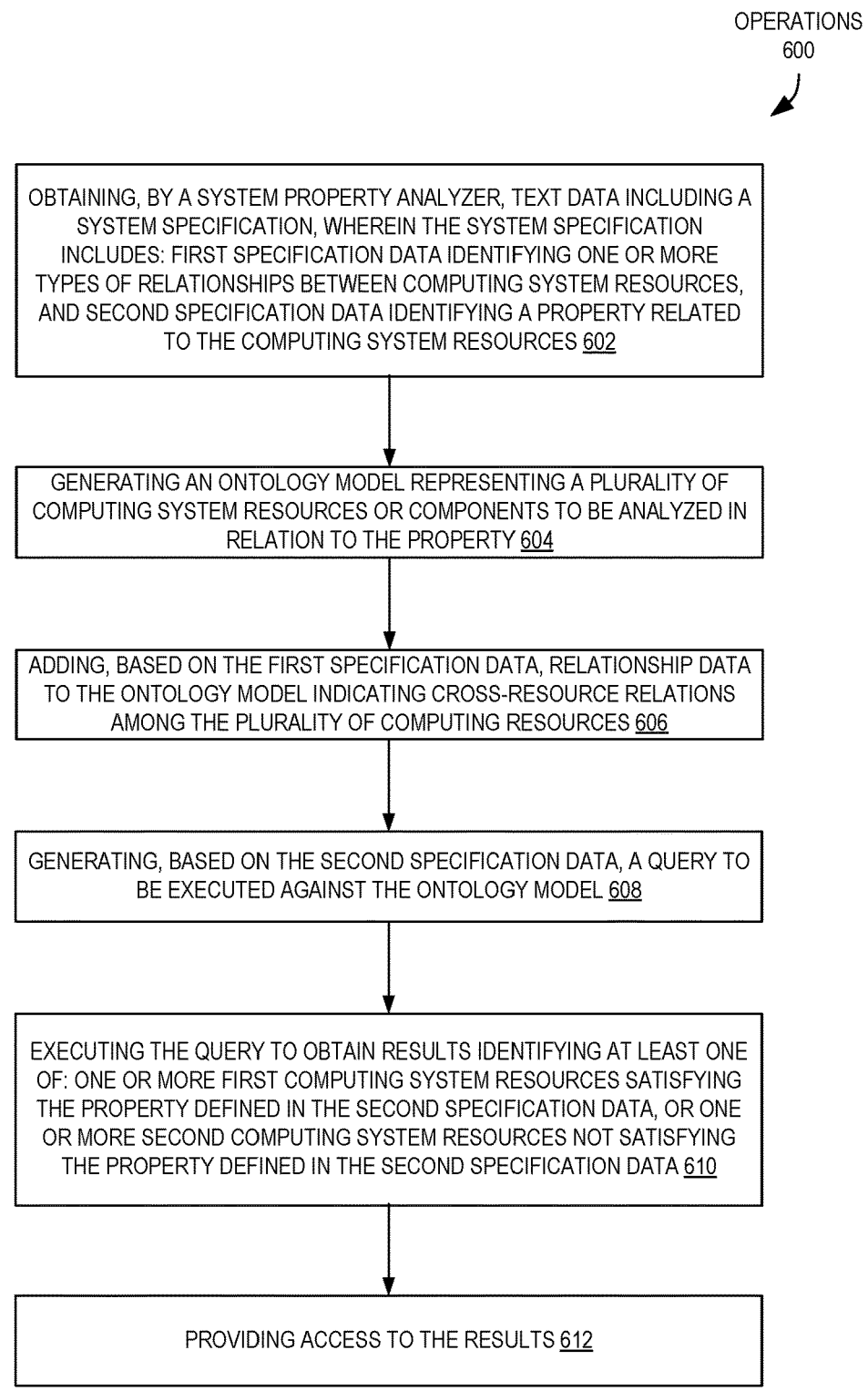
FIG. 6 is a flow diagram illustrating operations of a method for performing a graph-reachability-based analysis derived from a system specification according to some examples.

FIG. 6 is a flow diagram illustrating operations 600 of a method for using a domain-specific language and associated framework to implement an analysis involving computing system resources according to some examples. Some or all the operations 600 (or other processes described herein, or variations, and/or combinations thereof) are performed under the control of one or more computer systems configured with executable instructions, and are implemented as code (e.g., executable instructions, one or more computer programs, or one or more applications) executing collectively on one or more processors. The code is stored on a computer-readable storage medium, for example, in the form of a computer program comprising instructions executable by one or more processors. The computer-readable storage medium is non-transitory. In some examples, one or more (or all) of the operations 600 are performed by analysis tools 152 of the other figures.

The operations 600 include, at block 602, obtaining, by a system property analyzer, text data including a system specification, wherein the system specification includes: first specification data identifying one or more types of relationships between computing system resources, and second specification data identifying a property related to the computing system resources.

The operations 600 further include, at block 604, generating an ontology model representing a plurality of computing system resources or components to be analyzed in relation to the property.

The operations 600 further include, at block 606, adding, based on the first specification data, relationship data to the ontology model indicating cross-resource relations among the plurality of computing resources.

The operations 600 further include, at block 608, generating, based on the second specification data, a query to be executed against the ontology model.

The operations 600 further include, at block 610, executing the query to obtain results identifying at least one of: one or more first computing system resources satisfying the property defined in the second specification data, or one or more second computing system resources not satisfying the property defined in the second specification data.

The operations 600 further include, at block 612, providing access to the results.

In some examples, the system specification defines an analysis for at least one of: privilege escalation scenarios within the plurality of computing resources, computer network security configurations, instances of unencrypted computing resources, or instances of misconfigured resource logging configurations.

In some examples, causing display of the results includes displaying a report identifying a potential security issue related to the property, and wherein the report identifies one or more of the plurality of computing resources affected by the potential security issue.

In some examples, the one or more types of relationships between computing resources included in the system specification includes at least one of: a first computing resource configured to log to a second computing resource, a first computing resource configured to allow an action on a second computing resource, a first computing resource configured to trust a second computing resource, or a first computing resource configured to allow access to a second computing resource.

In some examples, the ontology model corresponds to a directed graph including nodes representing the plurality of computing resources and edges representing the cross-resource relations among the plurality of computing resources.

In some examples, the query conforms to a query language used to query graph data, and wherein the query is generated by a specification language compiler that translates the second specification data into the query.

In some examples, the operations further include: receiving, via a web-based console provided by a cloud provider network, input corresponding to the text data including the system specification; and receiving, via the web-based console, a request to perform the analysis based on the system specification.

In some examples, the operations further include receiving input modifying the system specification to obtain an updated system specification: updating the ontology model based on the updated system specification to obtain an updated ontology model: executing the query against the updated ontology model to obtain updated results; and providing access to the updated results.

In some examples, adding the relationship data to the ontology model further includes using a policy analyzer to determine whether a first computing resource of the plurality of computing resources is permitted to perform an action involving a second computing resource of the plurality of computing resources.

In some examples, the operations further include causing display, by a compiler for a specification language to which the system specification conforms, output indicating one or more syntax validation errors in the system specification.

In some examples, the system specification specifies a pass or failure condition, wherein the pass or failure condition includes a severity level, and wherein providing access to the results includes causing display of the severity level.

Figure 7:
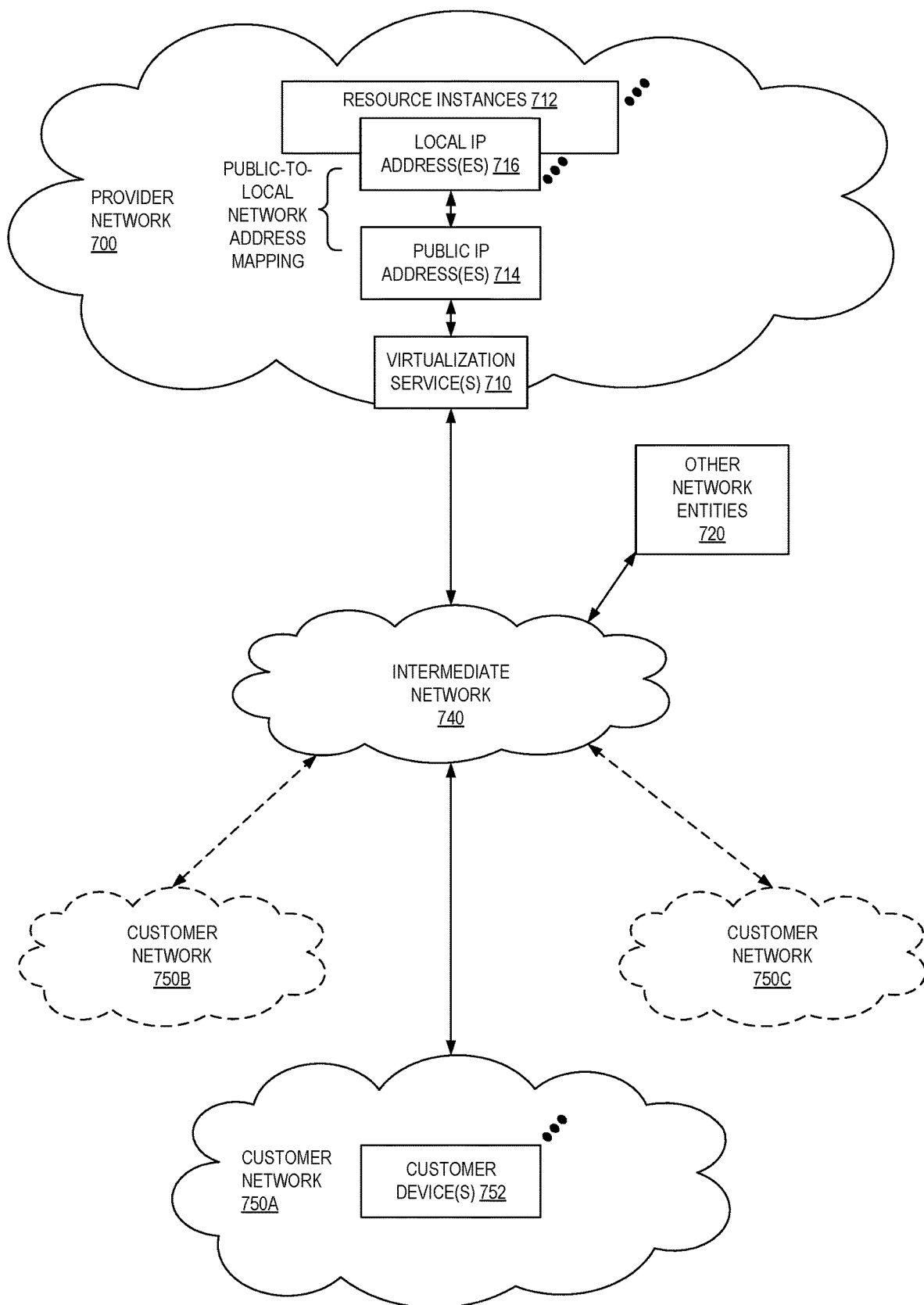
FIG. 7 illustrates an example provider network environment according to some examples.

FIG. 7 illustrates an example provider network (or "service provider system") environment according to some examples. A provider network 700 can provide resource virtualization to customers via one or more virtualization services 710 that allow customers to purchase, rent, or otherwise obtain instances 712 of virtualized resources, including but not limited to computation and storage resources, implemented on devices within the provider network or networks in one or more data centers. Local Internet Protocol (IP) addresses 716 can be associated with the resource instances 712: the local IP addresses are the internal network addresses of the resource instances 712 on the provider network 700. In some examples, the provider network 700 can also provide public IP addresses 714 and/or public IP address ranges (e.g., Internet Protocol version 4 (IPv4) or Internet Protocol version 6 (IPv6) addresses) that customers can obtain from the provider 700.

Conventionally, the provider network 700, via the virtualization services 710, can allow a customer of the service provider (e.g., a customer that operates one or more customer networks 750A-750C (or "client networks") including one or more customer device(s) 752) to dynamically associate at least some public IP addresses 714 assigned or allocated to the customer with particular resource instances 712 assigned to the customer. The provider network 700 can also allow the customer to remap a public IP address 714, previously mapped to one virtualized computing resource instance 712 allocated to the customer, to another virtualized computing resource instance 712 that is also allocated to the customer. Using the virtualized computing resource instances 712 and public IP addresses 714 provided by the service provider, a customer of the service provider such as the operator of the customer network(s) 750A-750C can, for example, implement customer-specific applications and present the customer's applications on an intermediate network 740, such as the Internet. Other network entities 720 on the intermediate network 740 can then generate traffic to a destination public IP address 714 published by the customer network(s) 750A-750C: the traffic is routed to the service provider data center, and at the data center is routed, via a network substrate, to the local IP address 716 of the virtualized computing resource instance 712 currently mapped to the destination public IP address 714. Similarly, response traffic from the virtualized computing resource instance 712 can be routed via the network substrate back onto the intermediate network 740 to the source entity 720.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and can be mutable within the provider network. Network traffic originating outside the provider network is not directly routed to local IP addresses: instead, the traffic uses public IP addresses that are mapped to the local IP addresses of the resource instances. The provider network can include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses can be assigned by the provider network infrastructure to particular resource instances: these public IP addresses can be referred to as standard public IP addresses, or simply standard IP addresses. In some examples, the mapping of a standard IP address to a local IP address of a resource instance is the default launch configuration for all resource instance types.

At least some public IP addresses can be allocated to or obtained by customers of the provider network 700; a customer can then assign their allocated public IP addresses to particular resource instances allocated to the customer. These public IP addresses can be referred to as customer public IP addresses, or simply customer IP addresses. Instead of being assigned by the provider network 700 to resource instances as in the case of standard IP addresses, customer IP addresses can be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 8:
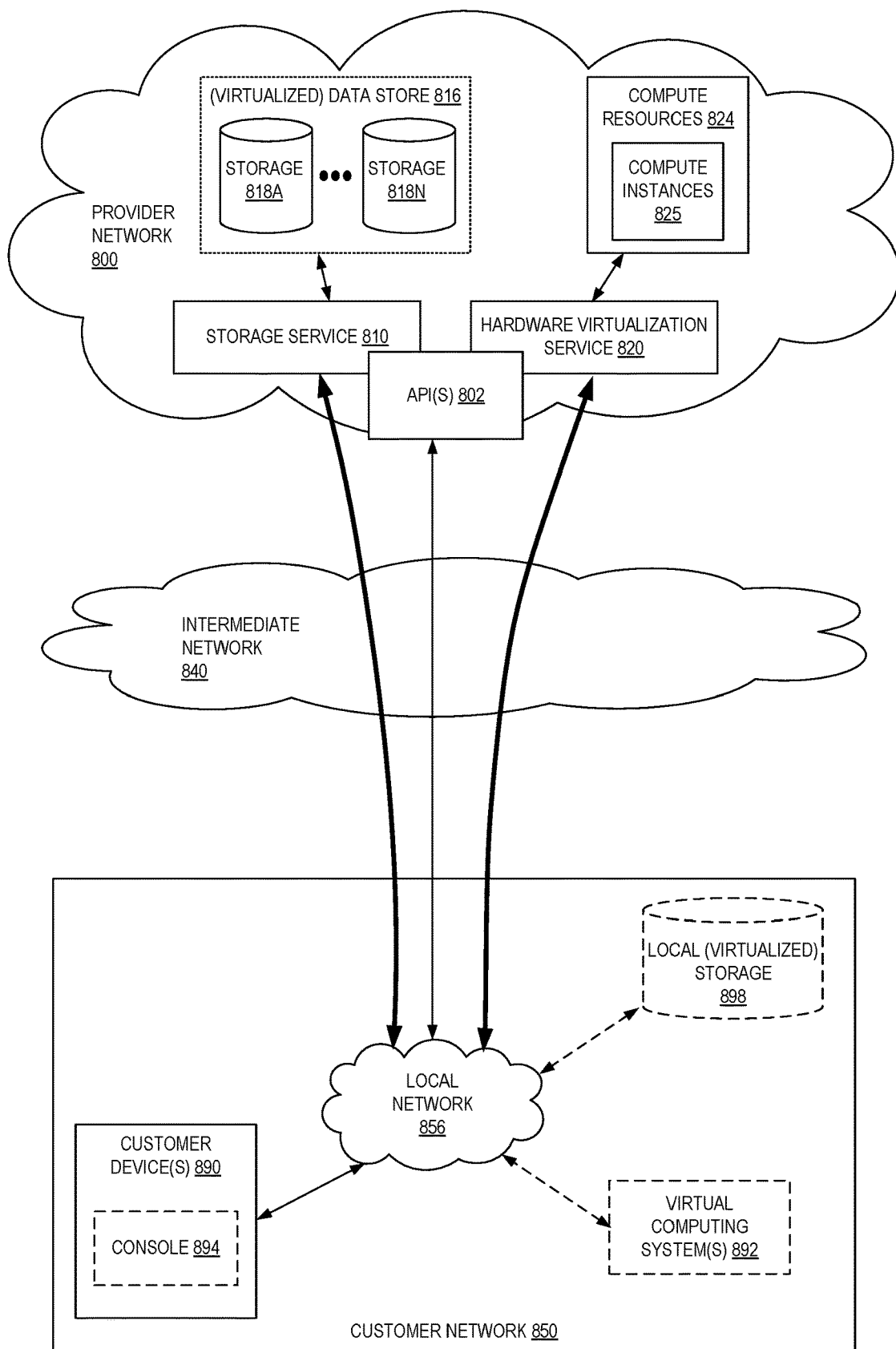
FIG. 8 is a block diagram of an example provider network that provides a storage service and a hardware virtualization service to customers according to some examples.

FIG. 8 is a block diagram of an example provider network environment that provides a storage service and a hardware virtualization service to customers, according to some examples. A hardware virtualization service 820 provides multiple compute resources 824 (e.g., compute instances 825, such as VMs) to customers. The compute resources 824 can, for example, be provided as a service to customers of a provider network 800 (e.g., to a customer that implements a customer network 850). Each computation resource 824 can be provided with one or more local IP addresses. The provider network 800 can be configured to route packets from the local IP addresses of the compute resources 824 to public Internet destinations, and from public Internet sources to the local IP addresses of the compute resources 824.

The provider network 800 can provide the customer network 850, for example coupled to an intermediate network 840) via a local network 856, the ability to implement virtual computing systems 892 via the hardware virtualization service 820 coupled to the intermediate network 840) and to the provider network 800. In some examples, the hardware virtualization service 820 can provide one or more APIs 802, for example a web services interface, via which the customer network 850 can access functionality provided by the hardware virtualization service 820, for example via a console 894 (e.g., a web-based application, standalone application, mobile application, etc.) of a customer device 890. In some examples, at the provider network 800, each virtual computing system 892 at the customer network 850 can correspond to a computation resource 824 that is leased, rented, or otherwise provided to the customer network 850.

From an instance of the virtual computing system(s) 892 and/or another customer device 890 (e.g., via console 894), the customer can access the functionality of a storage service 810, for example via the one or more APIs 802, to access data from and store data to storage resources 818A-818N of a virtual data store 816 (e.g., a folder or "bucket," a virtualized volume, a database, etc.) provided by the provider network 800. In some examples, a virtualized data store gateway (not shown) can be provided at the customer network 850 that can locally cache at least some data, for example frequently accessed or critical data, and that can communicate with the storage service 810 via one or more communications channels to upload new or modified data from a local cache so that the primary store of data (the virtualized data store 816) is maintained. In some examples, a user, via the virtual computing system 892 and/or another customer device 890, can mount and access virtual data store 816 volumes via the storage service 810 acting as a storage virtualization service, and these volumes can appear to the user as local (virtualized) storage 898.

While not shown in FIG. 8, the virtualization service(s) can also be accessed from resource instances within the provider network 800 via the API(s) 802. For example, a customer, appliance service provider, or other entity can access a virtualization service from within a respective virtual network on the provider network 800 via the API(s) 802 to request allocation of one or more resource instances within the virtual network or within another virtual network.

Figure 9:
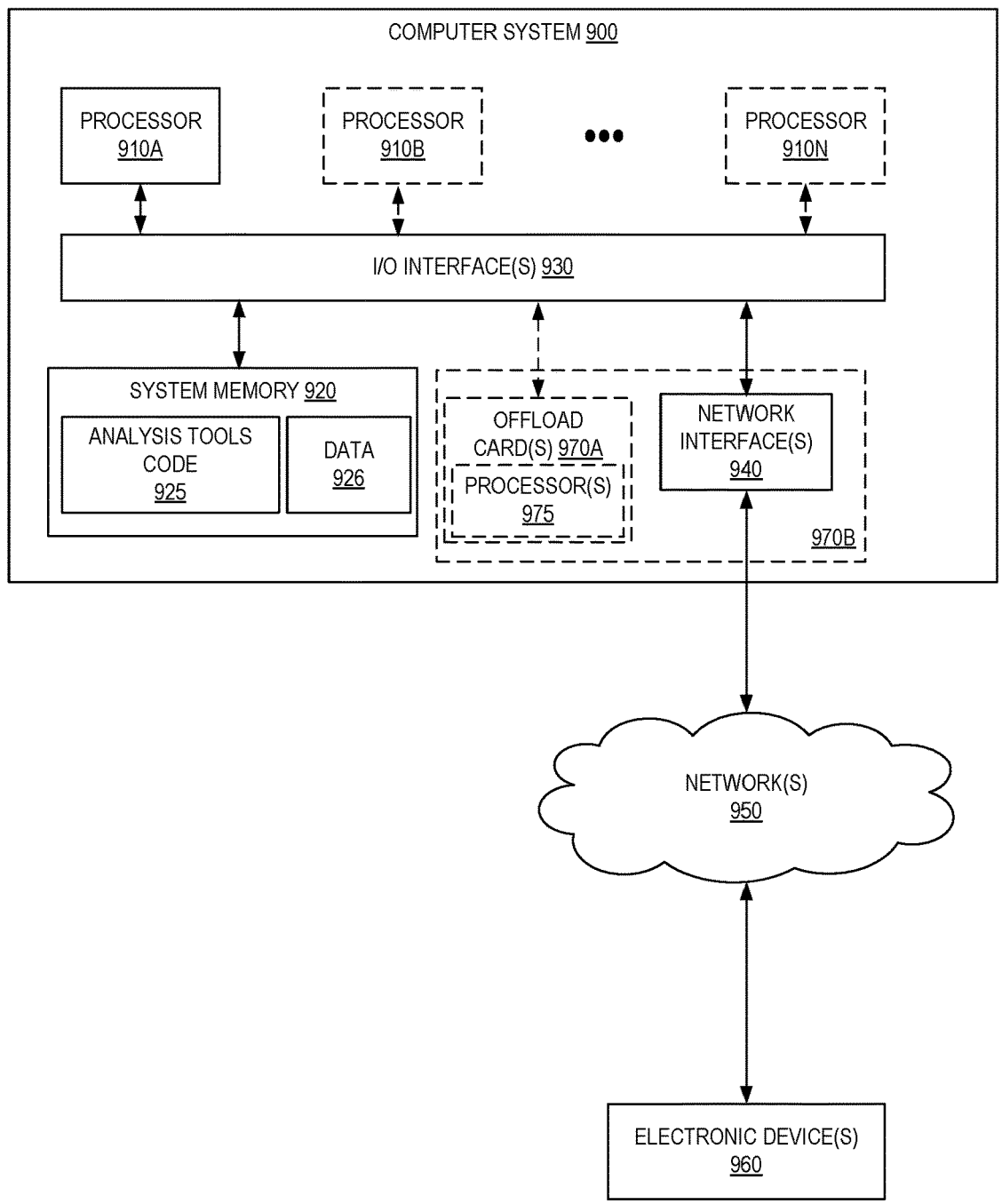
FIG. 9 is a block diagram illustrating an example computer system that can be used in some examples.

In some examples, a system that implements a portion or all of the techniques described herein can include a general-purpose computer system, such as the computer system 900 illustrated in FIG. 9, that includes, or is configured to access, one or more computer-accessible media. In the illustrated example, the computer system 900 includes one or more processors 910 coupled to a system memory 920 via an input/output (I/O) interface 930. The computer system 900 further includes a network interface 940 coupled to the I/O interface 930. While FIG. 9 shows the computer system 900 as a single computing device, in various examples the computer system 900 can include one computing device or any number of computing devices configured to work together as a single computer system 900.

In various examples, the computer system 900 can be a uniprocessor system including one processor 910, or a multiprocessor system including several processors 910 (e.g., two, four, eight, or another suitable number). The processor(s) 910 can be any suitable processor(s) capable of executing instructions. For example, in various examples, the processor(s) 910 can be general-purpose or embedded processors implementing any of a variety of instruction set architectures (ISAs), such as the x86, ARM, PowerPC, SPARC, or MIPS ISAs, or any other suitable ISA. In multiprocessor systems, each of the processors 910 can commonly, but not necessarily, implement the same ISA.

The system memory 920 can store instructions and data accessible by the processor(s) 910. In various examples, the system memory 920 can be implemented using any suitable memory technology, such as random-access memory (RAM), static RAM (SRAM), synchronous dynamic RAM (SDRAM), nonvolatile/Flash-type memory, or any other type of memory. In the illustrated example, program instructions and data implementing one or more desired functions, such as those methods, techniques, and data described above, are shown stored within the system memory 920 as analysis tools code 925 (e.g., executable to implement, in whole or in part, the analysis tools 152) and data 926.

In some examples, the I/O interface 930 can be configured to coordinate I/O traffic between the processor 910, the system memory 920, and any peripheral devices in the device, including the network interface 940 and/or other peripheral interfaces (not shown). In some examples, the I/O interface 930 can perform any necessary protocol, timing, or other data transformations to convert data signals from one component (e.g., the system memory 920) into a format suitable for use by another component (e.g., the processor 910). In some examples, the I/O interface 930 can include support for devices attached through various types of peripheral buses, such as a variant of the Peripheral Component Interconnect (PCI) bus standard or the Universal Serial Bus (USB) standard, for example. In some examples, the function of the I/O interface 930) can be split into two or more separate components, such as a north bridge and a south bridge, for example. Also, in some examples, some or all of the functionality of the I/O interface 930, such as an interface to the system memory 920, can be incorporated directly into the processor 910.

The network interface 940 can be configured to allow data to be exchanged between the computer system 900 and other devices 960 attached to a network or networks 950, such as other computer systems or devices as illustrated in FIG. 1, for example. In various examples, the network interface 940 can support communication via any suitable wired or wireless general data networks, such as types of Ethernet network, for example. Additionally, the network interface 940) can support communication via telecommunications/telephony networks, such as analog voice networks or digital fiber communications networks, via storage area networks (SANs), such as Fibre Channel SANs, and/or via any other suitable type of network and/or protocol.

In some examples, the computer system 900 includes one or more offload cards 970A or 970B (including one or more processors 975, and possibly including the one or more network interfaces 940) that are connected using the I/O interface 930 (e.g., a bus implementing a version of the Peripheral Component Interconnect—Express (PCI-E) standard, or another interconnect such as a QuickPath interconnect (QPI) or UltraPath interconnect (UPI)). For example, in some examples the computer system 900 can act as a host electronic device (e.g., operating as part of a hardware virtualization service) that hosts compute resources such as compute instances, and the one or more offload cards 970A or 970B execute a virtualization manager that can manage compute instances that execute on the host electronic device. As an example, in some examples the offload card(s) 970A or 970B can perform compute instance management operations, such as pausing and/or un-pausing compute instances, launching and/or terminating compute instances, performing memory transfer/copying operations, etc. These management operations can, in some examples, be performed by the offload card(s) 970A or 970B in coordination with a hypervisor (e.g., upon a request from a hypervisor) that is executed by the other processors 910A-910N of the computer system 900. However, in some examples the virtualization manager implemented by the offload card(s) 970A or 970B can accommodate requests from other entities (e.g., from compute instances themselves), and can not coordinate with (or service) any separate hypervisor.

In some examples, the system memory 920 can be one example of a computer-accessible medium configured to store program instructions and data as described above. However, in other examples, program instructions and/or data can be received, sent, or stored upon different types of computer-accessible media. Generally speaking, a computer-accessible medium can include any non-transitory storage media or memory media such as magnetic or optical media, e.g., disk or DVD/CD coupled to the computer system 900 via the I/O interface 930. A non-transitory computer-accessible storage medium can also include any volatile or non-volatile media such as RAM (e.g., SDRAM, double data rate (DDR) SDRAM, SRAM, etc.), read only memory (ROM), etc., that can be included in some examples of the computer system 900 as the system memory 920 or another type of memory. Further, a computer-accessible medium can include transmission media or signals such as electrical, electromagnetic, or digital signals, conveyed via a communication medium such as a network and/or a wireless link, such as can be implemented via the network interface 940.

Various examples discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most examples use at least one network that would be familiar to those skilled in the art for supporting communications using any of a variety of widely-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In examples using a web server, the web server can run any of a variety of server or mid-tier applications, including Hypertext Transfer Protocol (HTTP) servers. File Transfer Protocol (FTP) servers. Common Gateway Interface (CGI) servers, data servers. Java servers, business application servers, etc. The server(s) also can be capable of executing programs or scripts in response requests from user devices, such as by executing one or more Web applications that can be implemented as one or more scripts or programs written in any programming language, such as JavaR. C. C #or C++, or any scripting language, such as Perl, Python, PHP, or TCL, as well as combinations thereof. The server(s) can also include database servers, including without limitation those commercially available from Oracle(R), Microsoft(R). Sybase(R). IBM(R), etc. The database servers can be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of examples, the information can reside in a storage-area network (SAN) familiar to those skilled in the art. Similarly, any necessary files for performing the functions attributed to the computers, servers, or other network devices can be stored locally and/or remotely, as appropriate. Where a system includes computerized devices, each such device can include hardware elements that can be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system can also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate examples can have numerous variations from that described above. For example, customized hardware might also be used and/or particular elements might be implemented in hardware, software (including portable software, such as applets), or both. Further, connection to other computing devices such as network input/output devices can be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various examples.

In the preceding description, various examples are described. For purposes of explanation, specific configurations and details are set forth in order to provide a thorough understanding of the examples. However, it will also be apparent to one skilled in the art that the examples can be practiced without the specific details. Furthermore, well-known features can be omitted or simplified in order not to obscure the example being described.

Bracketed text and blocks with dashed borders (e.g., large dashes, small dashes, dot-dash, and dots) are used herein to illustrate optional aspects that add additional features to some examples. However, such notation should not be taken to mean that these are the only options or optional operations, and/or that blocks with solid borders are not optional in certain examples.

Reference numerals with suffix letters (e.g., 818A-818N) can be used to indicate that there can be one or multiple instances of the referenced entity in various examples, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters might or might not have the same number of instances in various examples.

References to "one embodiment," "an embodiment." "an example embodiment." etc., indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). Similarly, language such as "at least one or more of A, B, and C" (or "one or more of A, B, and C") is intended to be understood to mean A, B, or C, or any combination thereof (e.g., A, B, and/or C). As such, disjunctive language is not intended to, nor should it be understood to, imply that a given embodiment requires at least one of A, at least one of B, and at least one of C to each be present.

As used herein, the term "based on" (or similar) is an open-ended term used to describe one or more factors that affect a determination or other action. It is to be understood that this term does not foreclose additional factors that may affect a determination or action. For example, a determination may be solely based on the factor(s) listed or based on the factor(s) and one or more additional factors. Thus, if an action A is "based on" B, it is to be understood that B is one factor that affects action A, but this does not foreclose the action from also being based on one or multiple other factors, such as factor C. However, in some instances, action A may be based entirely on B.

Unless otherwise explicitly stated, articles such as "a" or "an" should generally be interpreted to include one or multiple described items. Accordingly, phrases such as "a device configured to" or "a computing device" are intended to include one or multiple recited devices. Such one or more recited devices can be collectively configured to carry out the stated operations. For example, "a processor configured to carry out operations A. B, and C" can include a first processor configured to carry out operation A working in conjunction with a second processor configured to carry out operations B and C.

Further, the words "may" or "can" are used in a permissive sense (i.e., meaning having the potential to), rather than the mandatory sense (i.e., meaning must). The words "include," "including." and "includes" are used to indicate open-ended relationships and therefore mean including, but not limited to. Similarly, the words "have," "having." and "has" also indicate open-ended relationships, and thus mean having, but not limited to. The terms "first," "second," "third," and so forth as used herein are used as labels for the nouns that they precede, and do not imply any type of ordering (e.g., spatial, temporal, logical, etc.) unless such an ordering is otherwise explicitly indicated.

The specification and drawings are, accordingly, to be regarded in an illustrative rather than a restrictive sense. It will, however, be evident that various modifications and changes can be made thereunto without departing from the broader scope of the disclosure as set forth in the claims.

What is claimed is:

1. A computer-implemented method comprising:
    obtaining, by a system property analyzer, data including a human-readable system specification, wherein the human-readable system specification conforms to syntax of a domain-specific language related to performance of security analyses involving computing resources provided by a cloud provider network, and wherein the system specification includes: first specification data identifying one or more types of relationships of interest between computing system resources, and second specification data identifying a security property related to computing system resources:
    obtaining resource configuration data related to a plurality of computing system resources, wherein the resource configuration data includes polices related to the plurality of computing system resources, and wherein the plurality of computing system resources includes at least one of: a user, a role, a compute resource, a storage resource, or a networking resource:
    generating an ontology model based on the resource configuration data, wherein the ontology model includes a representation of the plurality of computing resources:
    adding, based on the first specification data, relationship data to the ontology model indicating cross-resource relations among the plurality of computing resources, wherein a cross-resource relation involving a first computing resource and a second computing resource of the plurality of computing resources indicates that the first computing resource and the second computing resource satisfy one or more conditions defined in the first specification data:
    generating, based on the second specification data, a query to be executed against the ontology model:
    executing the query to obtain results identifying at least one of: one or more first computing system resources satisfying the security property defined in the second specification data, or one or more second computing system resources not satisfying the security property defined in the second specification data; and
    causing display of the results.

2. The computer-implemented method of claim 1, wherein the system specification defines an analysis for at least one of: privilege escalation scenarios within the plurality of computing resources, computer network security configurations, instances of unencrypted computing resources, or instances of misconfigured resource logging configurations.

3. The computer-implemented method of claim 1, wherein causing display of the results includes displaying a report identifying a potential security issue related to the security property, and wherein the report identifies one or more of the plurality of computing resources affected by the potential security issue.

4. A computer-implemented method comprising:
    obtaining, by a system property analyzer, text data including a system specification, wherein the system specification includes: first specification data identifying one or more types of relationships between computing system resources, and second specification data identifying a property related to the computing system resources:
    generating an ontology model representing a plurality of computing system resources or components to be analyzed in relation to the property:
    adding, based on the first specification data, relationship data to the ontology model indicating cross-resource relations among the plurality of computing resources:
    generating, based on the second specification data, a query to be executed against the ontology model:
    executing the query to obtain results identifying at least one of: one or more first computing system resources satisfying the property defined in the second specification data, or one or more second computing system resources not satisfying the property defined in the second specification data; and
    providing access to the results.

5. The computer-implemented method of claim 4, wherein the system specification defines an analysis for at least one of: privilege escalation scenarios within the plurality of computing resources, computer network security configurations, instances of unencrypted computing resources, or instances of misconfigured resource logging configurations.

6. The computer-implemented method of claim 4, wherein causing display of the results includes displaying a report identifying a potential security issue related to the property, and wherein the report identifies one or more of the plurality of computing resources affected by the potential security issue.

7. The computer-implemented method of claim 4, wherein the one or more types of relationships between computing resources included in the system specification includes at least one of: a first computing resource configured to log to a second computing resource, a first computing resource configured to allow an action on a second computing resource, a first computing resource configured to trust a second computing resource, or a first computing resource configured to allow access to a second computing resource.

8. The computer-implemented method of claim 4, wherein the ontology model corresponds to a directed graph including nodes representing the plurality of computing resources and edges representing the cross-resource relations among the plurality of computing resources.

9. The computer-implemented method of claim 4, wherein the query conforms to a query language used to query graph data, and wherein the query is generated by a specification language compiler that translates the second specification data into the query.

10. The computer-implemented method of claim 4, further comprising:
receiving, via a web-based console provided by a cloud provider network, input corresponding to the text data including the system specification; and
receiving, via the web-based console, a request to perform an analysis based on the system specification.

11. The computer-implemented method of claim 4, further comprising:
receiving input modifying the system specification to obtain an updated system specification:
updating the ontology model based on the updated system specification to obtain an updated ontology model:
executing the query against the updated ontology model to obtain updated results; and providing access to the updated results.

12. The computer-implemented method of claim 4, wherein adding the relationship data to the ontology model further includes using a policy analyzer to determine whether a first computing resource of the plurality of computing resources is permitted to perform an action involving a second computing resource of the plurality of computing resources.

13. The computer-implemented method of claim 4, further comprising causing display, by a compiler for a specification language to which the system specification conforms, output indicating one or more syntax validation errors in the system specification.

14. The computer-implemented method of claim 4, wherein the system specification specifies a pass or failure condition, wherein the pass or failure condition includes a severity level, and wherein providing access to the results includes causing display of the severity level.

15. A system comprising:
a first one or more electronic devices to implement a system property analyzer service in a multi-tenant provider network, wherein the system property analyzer service includes instructions that upon execution cause the system property analyzer service to:
obtain text data including a system specification, wherein the system specification includes: first specification data identifying one or more types of relationships between computing resources, and second specification data identifying a property related to the computing resources,
generate an ontology model representing a plurality of computing resources or components to be analyzed in relation to the property,
add, based on the first specification data, relationship data to the ontology model indicating cross-resource relations among the plurality of computing resources,
generate, based on the second specification data, a query to be executed against the ontology model,
execute the query to obtain results identifying at least one of: one or more first computing resources satisfying the property defined in the second specification data, or one or more second computing resources not satisfying the property defined in the second specification data, and
provide access to the results; and
a second one or more electronic devices to implement a policy analyzer service in the multi-tenant provider network, wherein the policy analyzer service includes instructions that upon execution cause the policy analyzer service to:
receive policy information associated with a first computing resource and second computing resource of the plurality of computing resources, and
determine whether the first computing resource is able to perform an action involving the second computing resource.

16. The system of claim 15, wherein the system specification defines an analysis for at least one of: privilege escalation scenarios within the plurality of computing resources, computer network security configurations, instances of unencrypted computing resources, or instances of misconfigured resource logging configurations.

17. The system of claim 15, wherein causing display of the results includes displaying a report identifying a potential security issue, and wherein the report identifies one or more of the plurality of computing resources affected by the potential security issue.

18. The system of claim 15, wherein the one or more types of relationships between computing resources included in the system specification includes at least one of: a first computing resource configured to log to a second computing resource, a first computing resource configured to allow an action on a second computing resource, a first computing resource configured to trust a second computing resource, or a first computing resource configured to allow access to a second computing resource.

19. The system of claim 15, wherein the ontology model corresponds to a directed graph including nodes representing the plurality of computing resources and edges representing the cross-resource relations among the plurality of computing resources.

20. The system of claim 15, wherein the query conforms to a query language used to query graph data, and wherein the query is generated by a specification language compiler that translates the second specification data into the query.

* * * * *